(12) United States Patent
Bhaskaran et al.

(10) Patent No.: US 10,558,940 B2
(45) Date of Patent: Feb. 11, 2020

(54) SUPPORTING A HANDLING OF INFORMATION ABOUT SHIPMENTS

(71) Applicants: Hari Bhaskaran, Bonn (DE); Sven Vanthienen, Prague (CZ)

(72) Inventors: Hari Bhaskaran, Bonn (DE); Sven Vanthienen, Prague (CZ)

(73) Assignee: Deutsche Post AG, Bonn (DE)

( * ) Notice: Subject to any disclaimer, the term of this patent is extended or adjusted under 35 U.S.C. 154(b) by 1140 days.

(21) Appl. No.: 14/926,627

(22) Filed: Oct. 29, 2015

(65) Prior Publication Data
US 2016/0140497 A1    May 19, 2016

(30) Foreign Application Priority Data
Nov. 19, 2014   (EP) .................................... 14193807

(51) Int. Cl.
*G06Q 10/08*    (2012.01)
*H04B 5/00*     (2006.01)
(Continued)

(52) U.S. Cl.
CPC ....... *G06Q 10/0835* (2013.01); *G06F 3/0482* (2013.01); *G06F 3/04842* (2013.01); *H04B 5/0031* (2013.01)

(58) Field of Classification Search
CPC . G06F 3/0482; G06F 3/04842; G06Q 10/083; G06Q 10/0835; G06Q 50/28;
(Continued)

(56) References Cited

U.S. PATENT DOCUMENTS 7,653,457 B2    1/2010   Bloom
8,078,485 B1 *  12/2011  Kraehmueller ...... G06Q 10/063
                                                     705/7.11
(Continued)

FOREIGN PATENT DOCUMENTS

CN    101124592 A    2/2008
CN    101160598 A    4/2008
EP    1 298 552 A1   4/2003

OTHER PUBLICATIONS

Mrim Alnfiai, VirtualEyez: Developing NFC Technology to Enable the Visually Impaired to Shop Independently, Jul. 2014, Dalhousie University (Year: 2014).*

*Primary Examiner* — Kevin H Flynn
*Assistant Examiner* — Ismail A Manejwala
(74) *Attorney, Agent, or Firm* — Reinhart Boerner; Van Deuren P.C.

(57) ABSTRACT

A device is provided which enables a courier to select one of two lists and to detect a selection of one of the two lists. A first list is provided for shipments that are to be delivered to a respective destination of the shipments by the courier and a second list is provided for shipments that are not to be delivered to a respective destination of the shipments by the courier. The device receives data that results from a scanning of at least one label that is associated with a shipment or with a group of shipments. The device adds at least one item to the selected list, each of the at least one item associated with a shipment or with a group of shipments, based on the received data. The device may perform these actions by an apparatus and/or by computer program that is executed by a processor.

12 Claims, 8 Drawing Sheets

(51) Int. Cl.
*G06F 3/0482* (2013.01)
*H04W 4/80* (2018.01)
*G06Q 50/28* (2012.01)
*G06F 3/0484* (2013.01)

(58) Field of Classification Search
CPC ............ G06Q 10/087; G06Q 10/0832; G06Q 10/0833; G06Q 10/08355; H04B 5/0031; H04W 4/80
See application file for complete search history.

(56) References Cited

U.S. PATENT DOCUMENTS

| | | |
|---|---|---|
| 2003/0115162 A1 | 6/2003 | Konick |
| 2004/0199285 A1 | 10/2004 | Berichon et al. |
| 2005/0119786 A1 | 6/2005 | Kadaba |
| 2006/0261164 A1* | 11/2006 | Bochicchio .......... G01G 19/083 235/385 |
| 2012/0173448 A1* | 7/2012 | Rademaker .......... G06Q 10/083 705/338 |
| 2014/0172739 A1* | 6/2014 | Anderson .......... G06Q 10/0836 705/338 |
| 2018/0285806 A1* | 10/2018 | Scofield ................ G06Q 10/08 |

\* cited by examiner

SUPPORTING A HANDLING OF INFORMATION ABOUT SHIPMENTS

CROSS-REFERENCE TO RELATED PATENT APPLICATION

This patent application claims priority to European Application No. 14 193 807.6, filed Nov. 19, 2014, the entire teachings and disclosure of which are incorporated herein by reference thereto.

FIELD OF THE INVENTION

The invention relates to supporting a handling of information about shipments, in particular shipments that are handled by couriers.

BACKGROUND

A courier of a logistics company may be involved in the transport of shipments in various ways.

A courier could load shipments for instance at a facility and deliver the shipments to a respective destination of the shipment. The destination may be the address of the addressee or a distinct delivery address.

If a courier tries to deliver a shipment at a destination but is not successful, the courier has to bring the shipment to another place, like a service point.

A courier might also be responsible for pickups, that is, for picking up shipments from a customer. The destination of such a pickup will usually not lie in the delivery area of the courier so that the courier has to handover the shipment to some facility sorting outbound shipments or to another courier, who might either deliver the shipment or hand it over to the facility.

Some couriers might operate as feeders. Such couriers might not be responsible for delivering shipments to destinations, or at least not exclusively. They might collect shipments at a particular transport node, like a distribution center, and hand over the shipments to couriers serving a suitable delivery area.

Some couriers might operate as sweepers. Such couriers might also not be responsible for delivering shipments to destinations, or at least not exclusively. For example, if a shipment could not be delivered due to a wrong address, it has to be returned to the sender. The courier who tried to deliver the shipments might handover the shipment to a sweeper, who may bring it to some facility for further handling.

SUMMARY OF THE INVENTION

It is an object of the invention to enable an efficient handling of information about on shipments.

An embodiment of a method according to the invention comprises, performed by a device, enabling a courier to select one of two lists managed by the device, a first list being provided for shipments that are to be delivered to a respective destination of the shipments by the courier and a second list being provided for shipments that are not to be delivered to a respective destination of the shipments by the courier, and detecting a selection of one of the two lists. The method further comprises receiving data that results from a scanning of at least one label that is associated with a shipment or with a group of shipments. The method further comprises adding at least one item to the selected list, each of the at least one item associated with a shipment or with a group of shipments, based on the received data.

Thus, the invention provides for certain embodiments that a device that is used by a courier enables a differentiation between data on shipments that are to be delivered by the courier and data on shipments that are not to be delivered by the courier. The data on shipments is obtained by scanning labels associated with the shipments. The differentiation is enabled by adding items that are based on data from the scanning to one of at least two different lists. The respectively appropriate list can be selected based on an input of the courier. In case of shipments that are to be delivered by the courier to their destination, the destination may be the address of the addressee or an alternative delivery address. Shipments that are not to be delivered by the courier can be shipments that are meant in the first place to be handed over to other couriers or to service points, etc. The scanning of labels can be performed by a courier, for example, when loading shipments into a vehicle for transport. Scanning labels that are associated with shipments will also be referred to as scanning shipments. A label can be associated with a single shipment; such a label can be for instance a label that is printed onto the shipment or affixed to the shipment. A label can also be associated with a plurality of shipments that are grouped in some way. Such a label could be attached for instance to a carriage comprising the shipments that is to be loaded into a vehicle. Accordingly, when data is added as an item of a selected list, the item may be associated with a single shipment or with a group of shipments.

It is a possible advantage of the invention that it facilitates the collection of data on shipments in a way that may be useful for management purposes and/or that may be useful for providing feedback to customers. It is a possible advantage of the invention that defining different lists for shipments that are to be delivered and for shipments that are not to be delivered may allow providing differentiated options to the courier when one of the lists is presented. This may make the device easier to handle for the courier. It is a possible advantage of the invention that the correct storage of data is simple for the courier, since once the correct list has been selected, data on scanned shipments is included automatically to the correct list. With this approach, the courier cannot forget to classify the shipments—compared e.g. to an approach in which a single list is used and all items that are to be delivered have to be marked manually.

An embodiment of an apparatus according to the invention comprises means for causing performance of the actions of any presented embodiment of the presented method. The means could be hardware means, software means or a combination of both.

Certain embodiments of an apparatus according to the invention may comprise for example at least one processor and at least one memory. The at least one memory stores a computer program. The at least one memory and the computer program are configured to cause a device to perform any presented embodiment of the presented method, when the computer program is executed by the at least one processor. Thus, the at least one memory and the computer program may be configured to cause a device to perform at least the following, when the computer program is executed by the at least one processor: enable a courier to select one of two lists managed by the device, a first list being provided for shipments that are to be delivered to a respective destination of the shipments by the courier and a second list being provided for shipments that are not to be delivered to a respective destination of the shipments by the courier, and detect a selection of one of the two lists; receive data that results from a scanning of at least one label that is associated with a shipment or with a group of shipments; and add at least one item to the selected list, each of the at least one item associated with a shipment or with a group of shipments, based on the received data.

Certain embodiments of such an apparatus may be implemented software-wise to perform the method. Implemented software-wise is to be understood to be a preparation of the apparatus that is required in order to enable a computer program stored in the at least one memory to be executed by the at least one processor in order to cause an apparatus to perform actions defined by the computer program. A processor can be for instance one or more control units, microprocessors, microcontroller units like microcontrollers, digital signal processors (DSP), application-specific integrated circuits (ASIC) or field programmable gate arrays (FPGA). A memory can be for instance an integrated data and program storage of the apparatus, an integrated dedicated program storage of the apparatus, a main storage of the at least one processor or a removable storage. A data and program storage or a program storage can be, among other things, a non-volatile storage. A main storage can be, among other things, a volatile or non-volatile storage, in particular a random access memory (RAM) and/or a flash memory. A non-volatile storage may be for instance a storage enabling random access, like a NOR flash memory, or a storage enabling sequential access, like a NAND flash memory, and/or a storage with read-only access (ROM), like an EPROM, EEPROM, or ROM. A removable storage could be for instance a memory stick or a CD-ROM.

An example embodiment of any of the presented apparatuses may be the device that is managing the lists, but it could also be for example a module for such a device. An example embodiment of any presented apparatuses may be at least one of the following: a device including a scanning component, a device including a barcode scanner, a device including a near field communication component, a mobile device, a component for a mobile device, a handheld device, a component for a handheld device, a mobile terminal, and a component for a mobile terminal. A mobile device is to be understood to be a device that is configured to be movable when in operation. A mobile terminal is to be understood to be a mobile device that is configured to enable a communication via a cellular communication network.

An embodiment of a system according to the invention comprises any embodiment of an apparatus according to the invention. In addition, the system may comprise one or more further apparatuses according to the invention. The first apparatus could be configured to enable a direct data communication with the at least one further apparatus, for example using a near field communication connection. Alternatively or in addition, the system may comprise a server. The apparatus or the apparatuses could be configured to enable a data communication with the server, for example using a cellular communication network. Alternatively or in addition, the system may comprise at least one printer. The apparatus or the apparatuses could be configured to trigger a printout of documents by the at least one printer.

An embodiment of a computer program according to the invention is configured to cause at least one device to perform the actions of any one embodiment of the presented method when executed by at least one processor.

A computer program may be stored in a computer readable medium. A computer program may equally be distributed via a network, for example a local network, a wide area network, a virtual network, a radio network like a mobile communications network, some other telephone network and/or the Internet. A computer program can be at least partly software and/or firmware of a processor. It is to be understood that the term computer program is also meant to cover a composition of several computer programs.

The invention can also be implemented in the form of a computer readable medium. An embodiment of such a computer readable medium may store any one embodiment of the presented computer program. The computer readable medium is to be understood to be a non-transitory computer readable medium. The computer readable medium may be for instance a magnetic, electrical, electro-magnetic, optical and/or any differently implemented storage medium. The computer readable medium can be removable and portable, or it may be configured to be permanently integrated in an apparatus. "Computer readable" means that the medium can be read and/or written by a computer or a data processing unit, for instance a processor. It can be for instance a program storage of a processor.

In certain embodiments of the presented method, the method further comprises, performed by the device: scanning the at least one label associated with a shipment or with a group of shipments by means of a scanning component of the device. This may have the advantage that the courier has to handle only a single device for adding items that are associated with scanned shipments or groups of shipments to the first list or to the second list.

In certain embodiments of the presented method, the method further comprises, performed by the device: creating for any shipment for which an item associated with the shipment has been added to the first list a with-delivery-courier event; assembling a message including an indication of the with-delivery-courier event; and transmitting the message to a server.

Transmitting an indication of such an event to a server may have the advantage that the server can be informed about all shipments that are with the delivering courier. Linking the creation of such an event to items in a particular list may have the advantage that the creation of the events is facilitated and may not require any further selection by the courier. A separate with-delivery-courier event may be created for each item on the first list. The events for all items may then be transmitted in a single message or in separate messages. Alternatively, a single with-delivery-courier event may be created in common for all items on the first list or for all items that have been newly added to the first list.

In certain embodiments, the presented method comprises assembling, by the device, a message with other or additional content and causing transmission of the message to a server.

The message may include an indication of a load-vehicle event that is created upon confirmation by the courier that a loading of shipments to a vehicle has been completed. As with the with-delivery-courier event, a common load-vehicle event may be created for all loaded shipments or separate load-vehicle events may be created for any loaded shipment or group of shipments. If the vehicle is a van, the load-vehicle event could be a load-van event. However, other vehicles could be used too in some cases, for instance delivery bicycles.

The message may include an indication of a depart event. A depart event may be created upon input by the courier indicating that the courier leaves a predetermined area, for instance a facility at which the courier collected, scanned and loaded the shipments into a vehicle. This may have the advantage that it is easy to implement. Alternatively, a depart event could be created automatically when the device or a vehicle used by the courier leaves a predetermined area. This may have the advantage that it reduces the tasks of the courier.

The message may include an indication of a not-home event that is created upon an indication input by the courier that a shipment could not be delivered at an indicated destination. This may be the case, if nobody is available for receiving the shipment at the destination address or in case it turns out that the address is not correct.

The message may include an indication of a handover event. A handover event may be created when a handover of shipments to a third party has been confirmed by the courier. A handover event may be created when a selection of a particular handover type by the courier is detected. Alternatively, a handover event may be created when data on shipments that are to be handed over to another courier has been transferred to a device of the other courier. In both alternatives, the relevant shipments may have previously been selected by the courier in some way, for instance by double scanning the shipments or by selecting items associated with the shipments in a list of items that is presented on a display.

The message may include an indication of an unload event. An unload event may be created when detecting a double scan of a label associated with a shipment or a group of shipments after an item associated with the shipment or the group of shipments has been added to the first list or the second list. It is to be understood that, as with any other event, other conditions may have to be met before such an event is actually created. For example, the courier may be required to confirm that unloading has been completed so that only a single load event has to be created for a number of shipments and/or groups of shipments.

The message may include an indication of an arrival event. An arrival event may be created upon input by the courier indicating arrival at a predetermined area. Alternatively, an arrival event may be created automatically when the device or a vehicle used by the courier enters a predetermined area. The predetermined area could be a facility where the courier parks a vehicle at the end of a working day.

The message may include information on a mileage of a vehicle input by courier. The mileage could be input by the courier for example at the beginning of each workday and/or at the end of each work day. Collecting information on the mileage may facilitate the maintenance of the vehicles by a logistics company.

It is to be understood that various other events could be reported as well, like a sign-on event that is created when a courier signs on at the device or a sign off event that is created when the courier signs off at the device.

Any message including an indication of an event may include in addition information that is associated with the event, like an identification of one or more shipments to which the event relates, an identification of the courier, an identification of a vehicle used by the courier, an indication of a time at which the event was created, etc.

The use of events enable near real time visibility of the status of shipments to a server and, if desired, to a customer accessing the server for tracking a shipment. Messages including indications of events can be transmitted whenever an event is created, or at regular intervals as far as a created event has not yet been reported to the server. In case messages are transmitted at regular intervals, a single message could include the information for all recently created events.

In certain embodiments, the presented method further comprises triggering, by the device, a print out of documents relating to a shipment for each of the shipments for which an item has been added to of one the first list and the second list. This may have the advantage that the courier can obtain specifically the documents needed for the scanned shipments. It is not necessary in this case, for instance, that the courier or some staff at a facility selects all required documents from a general pile of documents.

The triggering of the printout can be performed automatically or upon request by the courier. The printout can be realized in various ways. For instance, triggering the printout can comprise transmitting a request to a server, which stores electronic versions of the documents in files. Such a server could be a server of a facility at which the courier scans the shipments, and which retrieves the documents upon the request and which causes a printout at a printer of the facility. Alternatively, it could be for instance a distant, central server, which then instructs a printer of the facility to print the documents, e.g. via a separate server of the facility. The printing could be triggered by transmitting a request via a radio interface.

In certain embodiments, the presented method further comprises creating, by the device, a third list, the third list including items of the first list and items associated with shipments that are to be picked up by the courier at customer sites. This may have the advantage that data on all shipments that have to be considered by the courier and that may influence the actual route the courier takes may be comprised and presented in a single list. The items in the third list may be sorted as desired, for instance based on postal codes, street names and/or addressee names.

In certain embodiments, the presented method further comprises detecting, by the device, a selection of items of a list presented on a display by the courier, each item associated with a shipment or a group of shipments, wherein the list is one of the first list, the second list and a third list, the third list including items of the first list, items associated with shipments that are to be picked up by the courier at customer sites and items associated with shipments that have been picked up by the courier at customer sites. In these embodiments, the presented method further comprises detecting, by the device, a selection of a handover option by the courier. The device enables both selections. In these embodiments, the presented method further comprises presenting, by the device, a handover overview with a list of previously selected items on a display. This may have the advantage that a courier can be enabled to easily select and assemble data for shipments that are to be handed over. The assembly of the data can be used for various purposes, for instance for transferring the data, for deleting corresponding items from one or more lists, and/or for creating events for the shipments with which the items are associated, etc.

In certain embodiments, the presented method further comprises detecting, by the device, a selection of handover option, while a list is presented on a display, wherein the list is one of the first list, the second list and a third list, the third list including items of the first list, items associated with shipments that are to be picked up by the courier at customer sites and items associated with shipments that have been picked up by the courier at customer sites. In these embodiments, the presented method further comprises receiving, by the device, data of at least one label that is associated with a shipment or a group of shipments and that is scanned for handover. In these embodiments, the presented method further comprises presenting, by the device, a handover overview with a list of items, each item associated with a shipment or with a group of shipments for which a label has been scanned for handover. This may have the advantage that a courier can be enabled to easily select and assemble data for shipments that are to be handed over. In addition, scanning the shipments that are selected for handover may reduce errors in the selection of the data. Furthermore, the courier is not required to search for the shipments that are to be handed over in the list, which may reduce the required time for the handover.

It is to be understood that with both approaches, the device only has to offer a handover option for one or two of the lists. In one embodiment, the device could support a handover option for the second list and for the third list, the first list being used only as a basis for assembling the third list. It is to be understood that a device could support both approaches for assembling data for a handover. It is to be understood that in this case, it would be possible that the device supports different approaches for different lists.

In certain embodiments, the presented method further comprises detecting, by the device, a selection of a type of handover. Different types of handover may comprise for instance a handover to a service point, a feeder handover when the courier is operating as a feeder; a sweeper handover when shipments are to be handed over to another courier operating as a sweeper, a pickup handover for the case that the shipments that are to be handed over have been obtained by the courier by picking them up at a customer site. A feeder may be responsible, for example, for transporting shipments without delivering them to the destination of the shipments. The shipments could be handed over, for instance, to other couriers taking care of the delivery. A sweeper may be responsible, for example, for collecting shipments that are to be returned to the sender. The shipments could be received for instance from other couriers or at a service point. It is to be understood that some couriers may be responsible for different ones of these tasks on a single working day. It is to be understood that an alternative set of selectable handover types could be used just the same. Considering different handover types may have the advantage that this allows offering handover type specific options and/or causing handover type specific actions.

In certain embodiments, the presented method further comprises transferring data, by the device, to another device using a near field communication (NFC), the data being associated with at least one shipment selected for handover. The data may be the data that forms the basis of an item that had been added to the first list or the second list. Optionally, it could be supplemented by information that has been added later on by the courier to this item. Using NFC for the transfer may have the advantage that it is not necessary for the transfer to rely on cellular communication. The coverage of cellular communication networks may not be satisfactory at all locations at which a transfer of data is desired. Furthermore, it may have the advantage that the devices have to be fairly close to each other for the transfer, which may add to security. The range of an NFC connection can be limited to a short distance, for instance to about 5 meters or to about 20 centimeters.

In certain embodiments, the presented method further comprises removing, by the device, an item from a list. The list can be the first list or the second list, and optionally in addition a list generated based on one of the first list and the second list. An item can be removed upon detection of a selection of at least one type of handover by the courier, if the item is associated with a shipment that has been selected for handover. Alternatively, an item can be removed upon transfer of data forming a basis of the item, if the item is associated with a shipment that has been selected for handover. Both approaches may have the advantage that selected items can be removed automatically from relevant lists, once a further criterion has been met. The first approach can be used for example, if there is no transfer of item data for the handover of the shipments. In this case, the receiving entity may obtain data that is associated with the handed over shipments by scanning the shipments.

In certain embodiments of the presented method, the device is a first device, and the method comprises, performed by a further device receiving data from the first device using a near field communication, the data being associated with at least one shipment that is to be handed over. The method further comprises, performed by the further device, detecting an input of a courier indicating whether the at least one shipment is for delivery or not. The method further comprises, performed by the further device, adding at least one item to a first list managed by the further device, each of the at least one item associated with a shipment or with a group of shipments, based on the received data, in case an input is detected that the at least one shipment is for delivery, and adding at least one item to a second list managed by the further device, each of the at least one item associated with a shipment or with a group of shipments, based on the received data, in case an input is detected that the at least one shipment is not for delivery. This may have the advantage that also a device which receives data on shipments by a transfer of data from another device rather than by scanning is enabled to differentiate in a simple manner between shipments that are to be delivered and shipments that are not to be delivered.

The data may be transferred to the other device for example after confirmation of the courier using the second device. The confirmation could be requested instance automatically in a pop-up window when both devices are approached to each other and the first device requests the second device to establish a near field communication connection. The second device could return to the previous state once all actions relating to the handover have been completed.

Other example embodiments of the invention will be described in the following with reference to the figures. It has to be noted that the figures are only provided for illustration of the general concept of the invention by means of examples, not for defining the scope of protection of the invention. The figures are not drawn to scale. Features shall not be considered to be essential for the present invention because they are depicted in the figures.

DETAILED DESCRIPTION OF EMBODIMENTS OF THE INVENTION

The invention will be described in the following with reference to example embodiments, which support an efficient handling of information on shipments.

Figure 1:
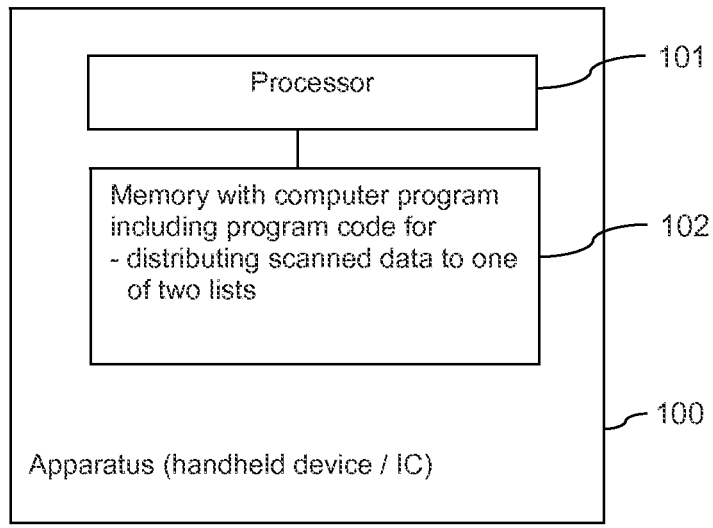
FIG. 1 is a block diagram of an example embodiment of an apparatus according to the invention.

FIG. 1 is a block diagram of an example embodiment of an apparatus 100 according to the invention.

The apparatus comprises a processor 101 and a memory 102, which are connected to each other. Memory 102 stores a computer program with program code. The computer program is a program for distributing scanned data to one of two selectable lists. Memory 102 is thus an example embodiment of a computer program product according to the invention and the stored computer program is an example embodiment of a computer program according to the invention. In addition, further computer programs, parameter values and/or any other kind of data could be stored in memory 102. Processor 101 could be a microprocessor or any other kind of processing unit. It could also be embedded into an integrated circuit (IC), for example together with memory 102 storing at least the computer program for distributing scanned data to one of two selectable lists.

Apparatus 100 could be for example a mobile terminal or some other handheld device. It could also be for example a module for a handheld device, like an integrated circuit or a chip. In another embodiment of an apparatus according to the invention, the apparatus could comprise a circuit, in which corresponding functions are implemented in hardware. Optionally, apparatus 100 could comprise any other desired components, like a scanning component, at least one transceiver for communication with other apparatuses, user input means, user output means, etc.

Processor 101 is configured to execute computer programs that is stored in memory 102 and thereby to cause a device to perform certain actions. The device caused to perform the actions can be apparatus 100 or some other apparatus, for example a handheld device comprising apparatus 100. An example of a sequence of such actions is illustrated in the flow chart of FIG. 2.

The device enables a courier to select one of two lists managed by the device and detects a selection of one of the two lists. A first list is provided for shipments that are to be delivered to a respective destination of the shipments by the courier and a second list is provided for shipments that are not to be delivered to a respective destination of the shipments by the courier. (action 201) Shipments that are not to be delivered to a respective destination of the shipments by the courier are meant to be handed over by the courier to some entity, like another courier. A list that is managed by a device can be any kind of data structure that is defined in the device and that enables the device to add items to the structure.

The device furthermore receives data that results from a scanning of at least one label that is associated with a shipment or with a group of shipments. (action 202)

The device furthermore adds at least one item to the selected list, each of the at least one item associated with a shipment or with a group of shipments, based on the received data. (action 203) Items may be added to a list for example by storing the data for the items in a data structure that is provided for the list, for instance as entries of a table. Alternatively, the data could be stored separately, and items may be added to the list for instance by creating links to the stored data. Other options are possible as well. The selected list may optionally be presented to the courier while items are being added so that the courier can monitor each update.

Actions 201 to 203 may constitute or belong to an example embodiment of a method according to the invention.

Figure 2:
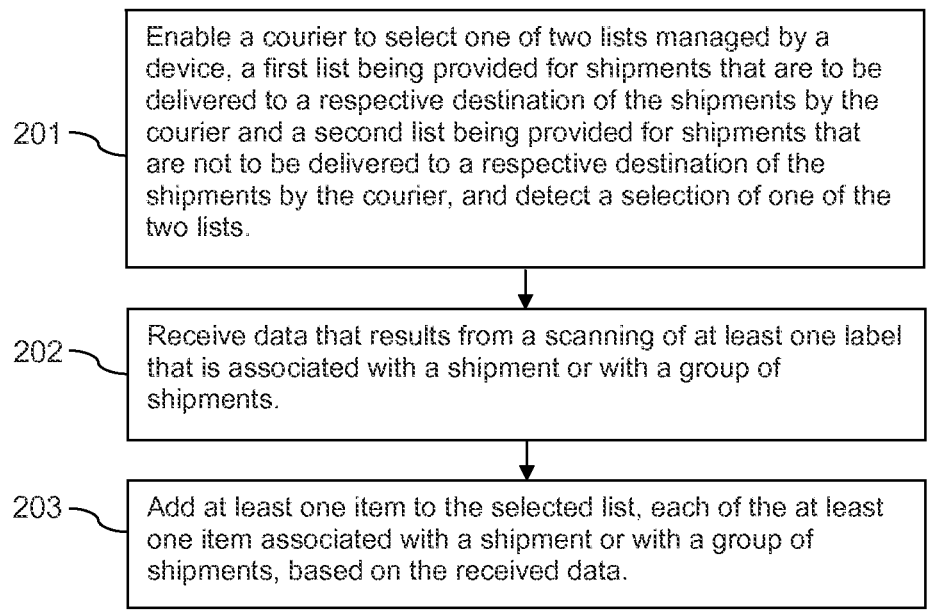
FIG. 2 is a flow chart illustrating an example embodiment of a method according to the invention.

Apparatus 100 of FIG. 1 and the method illustrated in FIG. 2 could be employed for example in a comprehensive system supporting an efficient handling of information on shipments.

Figure 3:
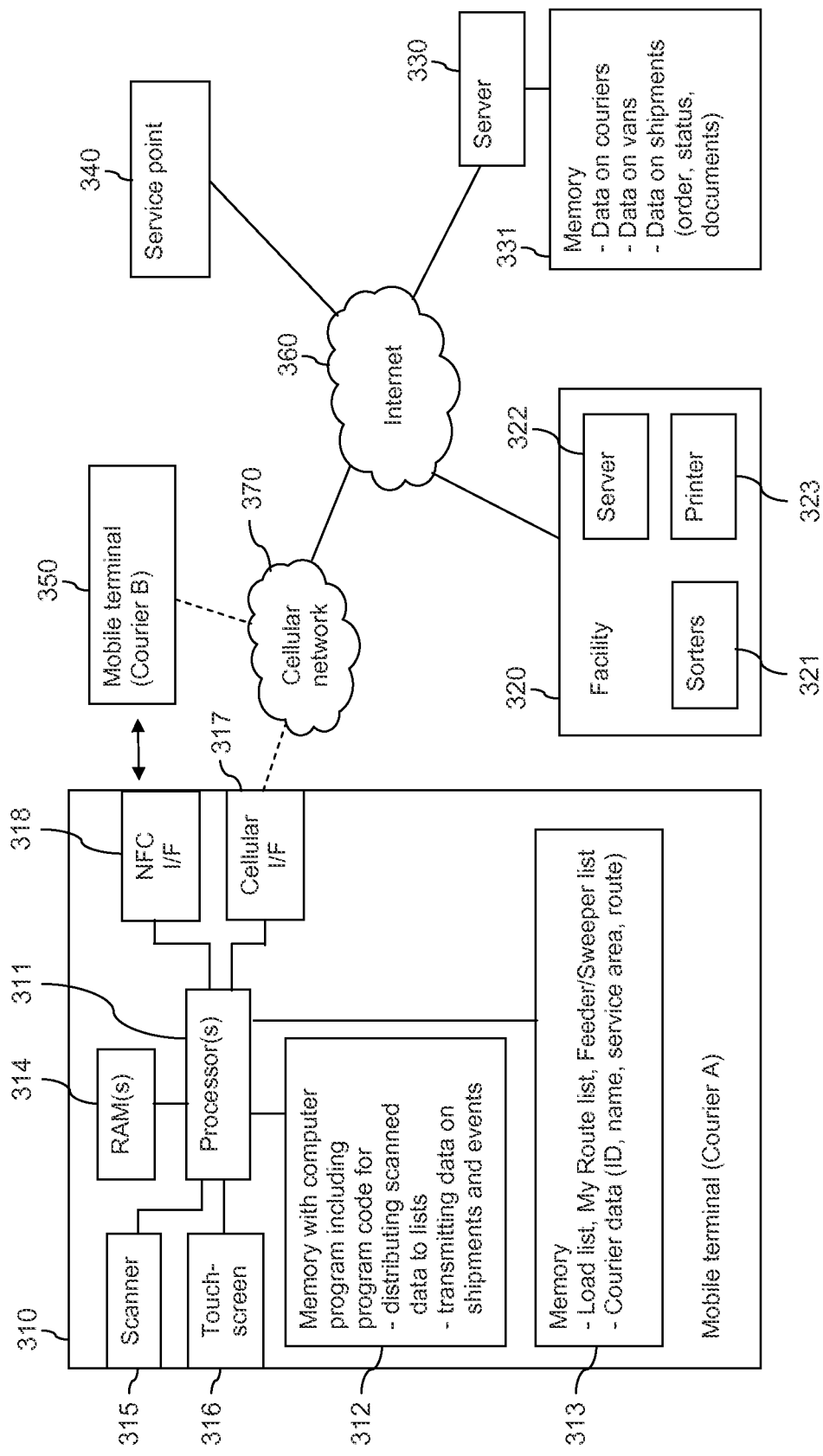
FIG. 3 is a block diagram of an example embodiment of a system according to the invention.

FIG. 3 is a block diagram of an example embodiment of a system of the invention.

The system comprises a mobile terminal 310 that may be used by a first courier A, a facility 320, a server 330, a service point 340 and a mobile terminal 350 that may be used by a second courier B. The system may moreover make use of the Internet 360 and a cellular communication network 370 for exchanging data.

Mobile terminal 310 includes at least one processor 311, a first memory 312, a second memory 313, at least one RAM 314, a scanner 315, a touchscreen 316, a cellular communication interface 317 and a near field communication interface 318.

Processor 311 is linked to each of components 312-318.

Memory 312 is a program memory of mobile terminal 310. Memory 312 stores program code for supporting the handling of information relating to shipments, including program code for distributing scanned data to lists, program code for creating events and transferring indications of events to a server via the cellular communication interface 317 and program code for transferring data about shipments to other mobile terminals via the NFC interface 318. The program code can belong to one or more computer programs. Memory 302 may store in addition any other program code for operating mobile terminal 310 and/or any other kind of data. Memory 312 could store for instance program code for decoding scanned data. Processor 311 is configured to execute program code of memory 312.

Memory 313 could be a general data memory of mobile terminal 310. It may store data of a database providing a structure for different lists of shipments, as well as data relating to courier A currently using mobile terminal 310, and any other kind of data. Processor 311 is configured to read data from memory 313 and to cause storage of data in memory 313 when executing corresponding instructions of some program code.

RAM 314 is a main memory of processor 311. Processor 311 may be configured to use RAM 314 for example for storing program code that is being executed and intermediate results.

Scanner 315 could be any kind of scanning component that is suited to read information from a type of label that is used in the system and to decode the read information. Such a type of label could be for instance a one-dimensional barcode or a matrix barcode, like a quick response (QR) code, or it could comprise a transponder. In case the label is a barcode, scanner 315 could be a special scanning component, like a laser scanner or a charge-coupled device (CCD) reader. It could also be a camera of mobile terminal 310. In case the label comprises a transponder, the transponder could be in particular a passive transponder and the scanner 315 could comprise an energizing and detection component for reading out information that is stored in the transponder. The decoding of a captured barcode can be achieved by means of a suitable software application. Such a software application could be stored for example in a memory of scanner 315 and executed by a separate processor of scanner 315; or it could be stored for example in memory 312 and executed by processor 311. In the present example, it is assumed that labels contain barcodes and that scanner 315 is a barcode scanner which takes care of reading and decoding barcodes.

Touch screen 316 is an example user input and output means. Additional or alternative user input and output means could be provided as well. For example, mobile terminal 310 could comprise additional buttons or keys as well as loudspeakers.

Cellular communication interface 317 is configured to enable a communication with other devices via a cellular communication network 370. It enables mobile terminal 310, for instance, to exchange data with server 330 via cellular communication network 370 and the Internet 360. Cellular communication interface 317 could comprise for instance a suitable transceiver and processing means for taking care of any data processing required for the communication, or a transceiver only. In the latter case, the data processing required for a communication via a cellular transceiver could be realized for instance by processor 311 using additional program code that is stored in memory 312.

NFC interface 318 is configured to enable a direct radio based communication with other mobile terminals over a short distance according to the NFC standard. It is to be understood that any other interface enabling a direct and secure exchange of data with other mobile terminals could be used as well.

Processor 311 is arranged to be able to receive data via cellular communication interface 317 and via NFC interface 318 and to cause transmissions of data via cellular communication interface 317 and NFC interface 318.

Apparatus 100 of FIG. 1 could thus correspond to mobile terminal 310 or to a module, like a chip or an integrated circuit, of mobile terminal 310 comprising processor 311 and memory 312 or RAM 314 and, optionally, any other component.

Facility 320 could be for example a sorting and distribution center of a logistics company. Shipments may arrive at facility 320 and be fed to sorters 321. Sorters 321 may be configured to sort the shipments according to their destination. Facility 320 may further comprise a server 322 and a printer 323. Printer 323 could be connected to server 322 by a cable based local area network (LAN) or via a wireless local area network (WLAN) of facility 320. Server 322 may be configured and arranged to communicate with other entities via the Internet 360, for example with server 330.

Server 330 is configured and arranged to communicate with other entities via the Internet 360, for example with various mobile terminals, with various facilities and with various service points. It may also provide access to customers via the Internet 360. Server 330 is configured to collect and manage data on shipments, couriers and transport vehicles, and to prepare status information on shipments for access by customers.

The data of one or more databases employed by server 330 to this end may be stored in an internal or external memory 331. The data could also be distributed to several memories. Server 330 is enabled to access the data in each of the memories, either directly or via some other server (not shown) controlling the access to the respective memory. The term database can be understood to relate only to a collection of data using a particular structure, but it could also denote a database management system including the data as well as some software application designed to enable a processor to create and manage the data. Such a processor could be a processor of server 330 or a processor external to server 330.

Service point 340 can be a manned service point or an unmanned service point. A manned service point can be for instance a branch of the logistics company or some other entity having an agreement with the logistics company to provide certain services for the logistics company. Such another entity could be for instance a tobacco shop. An unmanned service point can be for instance a pack station.

Mobile terminal 350 may comprise the same components as mobile terminal 310. It may also comprise the same computer program stored in a memory for execution by a processor.

In the system, different routes are assigned to different couriers. With the route design, a particular meeting point and a particular meeting time for all couriers in a certain area may be defined. This meeting point may thus be used for handover of shipments between couriers.

The system of FIG. 3 can be modified in many ways by omitting components and/or by adding component. Such variations may result in further or alternative advantages. For example, the system could comprise an arbitrary number of mobile terminals, service points and facilities. Also vehicles used by the couriers could be considered to be a part of the system.

FIGS. 4 to 10 illustrate example operations in the system of FIG. 3.

Figure 4:
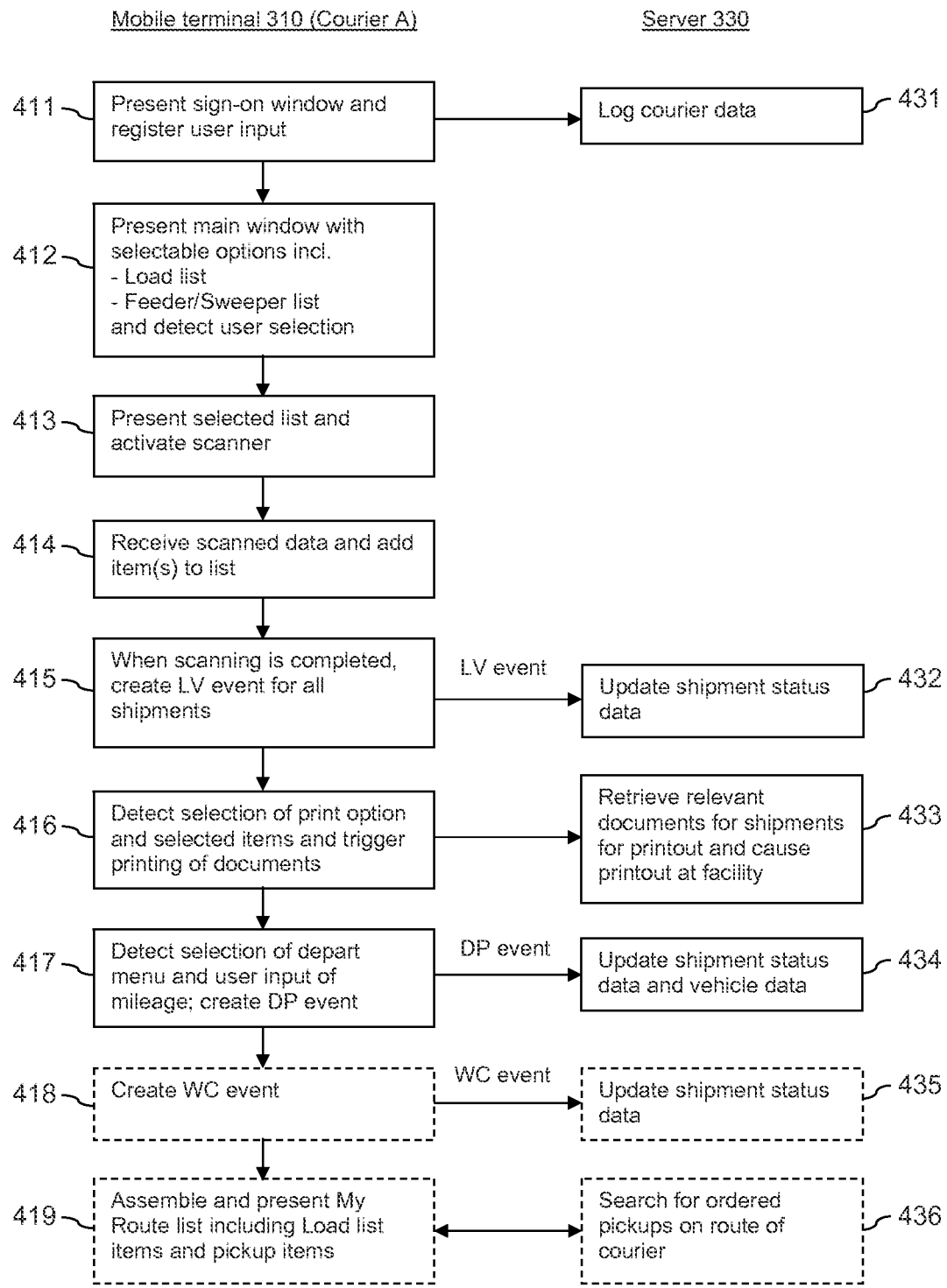
FIG. 4 is a flow chart illustrating first example operations in the system of FIG. 3.

FIG. 4 is a flow chart illustrating an operation when a courier collects shipments at a facility. The operations presented on the left hand side are carried out by mobile terminal 310 when processor 311 runs program code for supporting the handling of information relating to shipments from memory 312. The operations presented on the right hand side are carried out by server 330. Any communication between mobile terminal 310 and server 330 may take place via cellular communication network 370 and the Internet 360. By way of example, any presentation of mobile terminal 310 to a courier may take place via touchscreen 316 and any input to mobile terminal 310 by a courier may equally take place via touchscreen 316.

In facility 320, sorters 321 sort shipments according to their destination. The shipments output by a particular sorter belt may be destined for a particular courier, or they may be sorted further by personnel such there is a separate pile for each courier collecting shipments at the facility. Each shipment comprises a label, for instance a matrix barcode. Alternatively or in addition, there may be a group label that may be attached, for example, to a cage in which the shipments belonging to the group are located. Such a cage can be placed in front of the loading area of a van that is to be used by the respective courier. The label may include various pieces of information on the shipment in coded form. It may include for instance a shipment identification or shipment group identification, a destination address, a name of an addressee, a contact person of an addressee, a product code, the number of pieces, payment details, etc. It may also include sender information. The destination address may differ from the address of the named addressee.

When courier A arrives at a facility for collecting shipments, courier A activates his mobile terminal 310. As a result, mobile terminal 310 presents a log-on window and registers any input by courier A. (action 411) The requested input may include a courier identification, a courier name, an identification of the facility at which the courier logs on, an identification of the region, an identification of the route served by the courier, and an identification of the van used by the courier. The route may define an area assigned to courier A. The actual route taken by courier A within this area could be decided on by courier A depending on the shipments that are to be handled that day. It is to be understood that not all of this information may be required and that additional information may be requested as well. Mobile terminal 310 creates a sign-on event, assembles a message including an indication of the event and associated information, and transmits the message to server 330.

Server 330 receives the information that is included in the message and logs the associated data for courier A in memory 331. (action 431)

The sign-on process may also include an authentication of the courier. The courier identification may serve for authenticating the courier. Alternatively, a password could be requested in addition for the purpose of authentication. The authentication could be performed by mobile terminal 310 on its own, or it could receive a feedback from server 330 whether the data input by courier A is consistent.

When courier A has successfully signed on, mobile terminal 310 presents a main window for a loading phase with selectable options. Such options may include "Load list", "Feeder/Sweeper list", "Route overview", "Inbox", "Commodity lookup", "Settings", "Modify sign on" and "Sign off". In addition, a virtual back button, a virtual home button, etc., may be presented. It is to be understood that the selection options may be varied in many ways. For the following description, only the options "Load list" and "Feeder/Sweeper list" of this main window are of interest.

The option "Load list" is to be selected by courier A, in case the provided shipments are to be delivered by courier A to the destination. The option "Feeder/Sweeper list" is to be selected by courier A, in case the provided shipments are to be handed over by courier A to another courier or to some service point. For example, some flights containing shipments that are to be delivered on the same day may arrive at an airport in the afternoon, when the delivering couriers are already on route and do not have time to collect these shipments. Facility 320 may be in or close to the airport and receive the shipments for sorting. In this case, courier A may operate as a feeder courier, collect the shipments arriving with the afternoon flight for a number of delivering couriers and meet the delivering couriers one by one at predefined meeting points forming part of the operational route of the respective delivering courier to hand over a respective part of the shipments to each.

Mobile terminal 310 detects a selection of the option "Load list" or of the option "Feeder/Sweeper list" by courier A. (action 412)

Mobile terminal 310 presents the selected type of list on touchscreen 316 and activates scanner 315. (413) The list can be provided with a heading "Load list" or "Feeder/Sweeper list", in line with the selection.

Courier A may now scan the label on each provided shipment or each group label, as the case may be, and load the respectively scanned shipment or cage into the van.

Mobile terminal 310 detects and decodes the scanned data, and uses the data to add an item to the list. This comprises storage of the data with association to a new item of the selected list in memory 313, and including the item in the list that is presented on touchscreen 316. (action 414)

If a group label is scanned, a group item may be created and presented automatically. A group item may be a kind of a folder with general group information, and which allows presenting details on the included shipments as sub-items when opening the folder, if available. The general group information could comprise a group icon, a group name or group barcode, the number of shipments and pieces in the group, the number of invoices for all shipments in the group and special instructions for the group, etc. A group can also be created manually by courier A for certain shipments, for instance a group for all shipments that are to be delivered for a single addressee or for all shipments that are to be handed over to a particular other courier. To this end, courier A may create a group by selecting a "New group" option and then scan shipments into this group. Alternatively, courier A may mark items on the presented list and then select a grouping option. If the group is created manually, some information of the general information for the group item that is presented, like a group name, may be input by the courier. Other information, like the number of shipments, may be determined automatically based on the scanned shipments or the selected items.

If courier A notices that a shipment has been scanned by mistake, the corresponding item may be removed again from the list by selecting an unload option and by double-scanning the label of the shipment. The item and the associated data is then removed again from memory 313 and from the list presented on touchscreen 316.

When the loading of the van is completed, courier A may confirm to mobile terminal 310 that all shipments have been scanned and loaded by a corresponding option offered by mobile terminal 310. When mobile terminal 310 detects that the scanning has been completed, mobile terminal 310 creates a load van (LV) event. Mobile terminal 310 transmits a message including an indication of a load van event for all scanned shipments, identified by the respective shipment identification, and an identification of courier A, to server 330. (action 415)

Server 330 updates the shipment status for each identified shipment in memory 313. (action 432)

The presentation of the respective list may include a selectable print option. This option allows triggering a printing of all documents that are associated with the shipments on printer 323 of facility 320. Such documents may include invoices for payments that are to be collected by courier A from the addressee or other financial documents, custom documents, etc. The print option may be associated automatically with all items on the presented list, but it would also be possible to enable courier A to select certain items at first. A selection of the print option may then relate to the selected items only.

When a selection of the print option is detected by mobile terminal 310, the printing is triggered. (action 416) The printing may be triggered in various ways. For example, the documents may be stored in electronic form in memory 331. The selection of the print option could be transmitted to server 330, potentially along with an identification of the selected shipments. Otherwise, server 330 may obtain the identifications of all loaded shipments from the information received with the message for the preceding LV event from mobile terminal 310. Server 330 may then retrieve the electronic version of the documents for each shipment that has been loaded into the van from memory 331 based on all or selected ones of the shipment identifications. The data may be transmitted by server 330 to server 322 of facility 320, which may then cause the printout of the documents on printer 323. (action 433) Alternatively, the data could be transmitted by server 330 to requesting mobile terminal 310, which may forward the data for printout to printer 323, for example via server 322. The communication with server 322 could take place using a WLAN of facility 321 or via cellular network 370 and the Internet 360. It is to be understood that a communication via WLAN would require mobile terminal 310 to be WLAN enabled in addition. Further alternatively, the electronic version of all documents for shipments that are processed in facility 320 could be provided to facility 320 in advance. In this case, a communication with server 330 would not be necessary for triggering the printout. Either server 330 or server 322 may provide a feedback to mobile terminal 310 with an indication of the number of invoices or of other documents that will be printed out for each shipment. Corresponding information could be added to the stored information on the respective shipment in memory 313 and possible to the content of the displayed items. This information could also be included in the scanned barcode data, though.

Courier A may collect the printed documents from printer 323 and start on route.

Once the documents have been collected, courier A may select a depart menu offered by mobile terminal 310. The depart menu prompts courier A to input the current mileage of the van. Courier A may input the mileage, confirm that he is about to depart and leave the area of facility 320 with the van and the loaded shipments. When mobile terminal 310 detects the input, it creates a depart (DP) event. Mobile terminal 310 assembles a message including an indication of a depart event, an identification of courier A, an indication of the mileage, and possibly an indication of the current time, and transmits the message to server 330. (action 417) It is to be understood that the information that the courier leaves the area of facility 320 could also be obtained by other means that do not require a user input, for instance using geofencing. The mileage could be obtained in this case for example by a communication between mobile terminal 310 and a control system of the van that is triggered by a detected departure.

Server 330 updates the shipment data and the vehicle data in memory 313 based on the information in the received message. (action 434) For facilitating the update of the shipment data, the message could also include the shipment identifications again. Alternatively, if the depart event is only created once at the beginning of a working day of courier A, server 330 could associate an indication of a depart event with all shipments that have been associated with courier A in memory 313 when processing the message with the indication of the load van event.

In case the selected list was the Load list, action 417 may furthermore trigger the creation of a with-delivery-courier (WC) event at mobile terminal 310 for all shipments that have been scanned into this list. (action 418) A message indicating this event and the associated shipment identifications is transmitted to server 330. Server 330 may update shipment status data based on this event in memory 313. (action 435) This enables server 330 to provide the information to customers (senders or addressees) accessing server 330 for tracking a posted shipment that the shipment is now with the delivering courier and thus on its final leg.

In case the selected list was the Load list, mobile terminal 310 may assemble in addition a My Route list as a third list and present this list on touchscreen 316. (action 419) The My Route list may be a list combining the items that are based on the scanned data for shipments that are to be delivered and pickup items, which indicate to courier A data about shipments that have to be picked up from customers on the route. For creating the My Route list, mobile terminal 310 communicates with server 330, which searches for ordered pickups on the route of courier A and which provides the associated data to mobile terminal 310. The associated data could include for instance address information, but also a particular period of time that has been requested for the pickup. (action 436) It is to be understood that information on ordered pickups could also be received later on at server 330. Server 330 could then inquire with courier A whether he may still take care of the pickup, and if confirmed, the data of the My Route list is updated accordingly based on data provided by server 330. It has to be noted that the common items of the Load list and of the My Route list do not necessarily have be stored twice. The data for the items could be stored once and be associated with both lists by pointers or by setting a parameter value attached to the data that is provided to this end.

Figure 5:
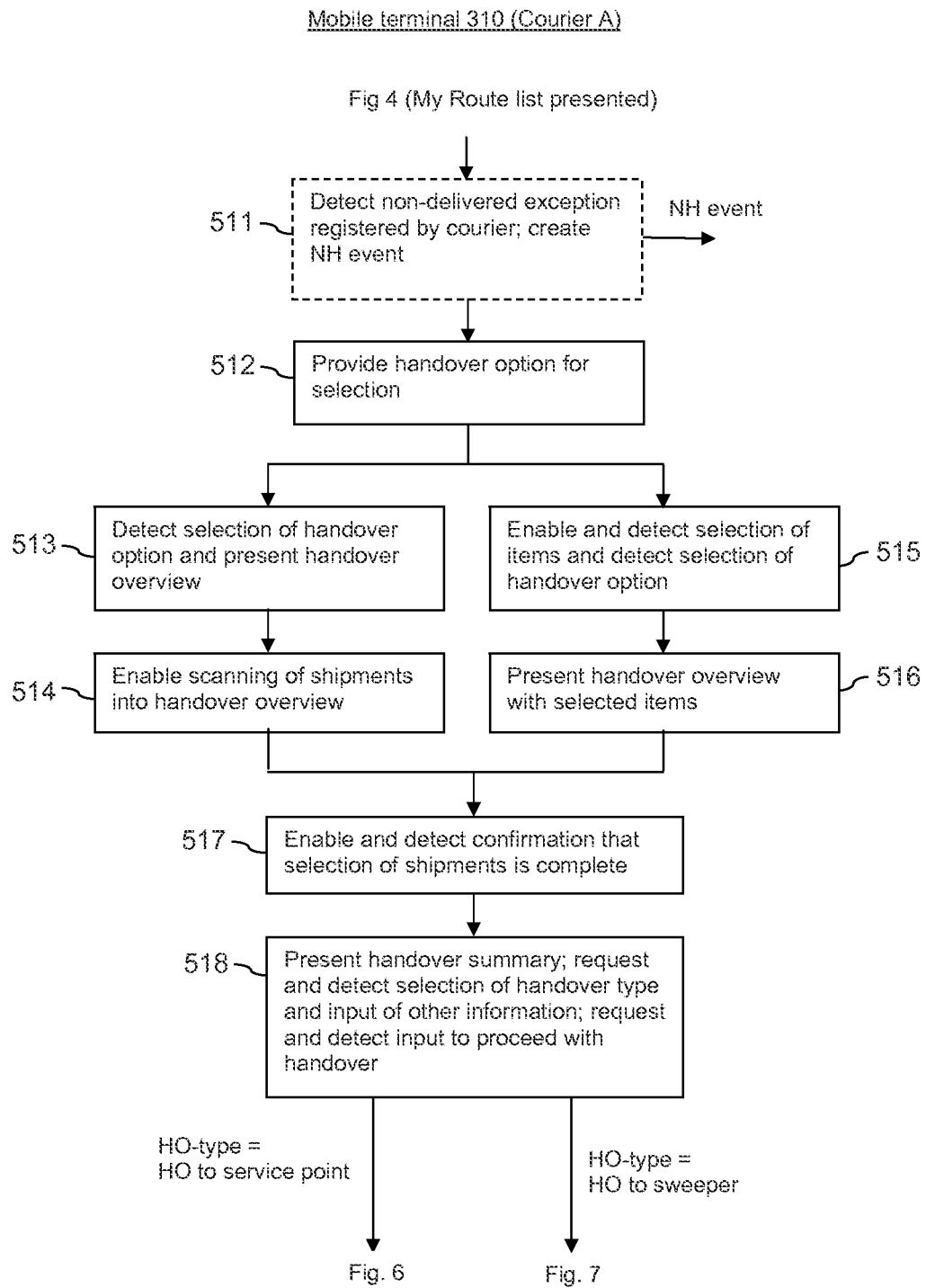
FIG. 5 is a flow chart illustrating second example operations in the system of FIG. 3.

FIG. 5 is a flow chart illustrating examples of further handling of shipments following the operations of FIG. 4, that is, once the van of courier A has been loaded at facility 320. The presented operations are carried out by mobile terminal 310 when processor 311 runs program code for supporting the handling of information relating to shipments from memory 312.

It is assumed that the shipments have been loaded for delivery and thus scanned into the Load list, and are now being presented on the My Route list according to action 419 of FIG. 4.

If the destination of a shipment corresponds to the address of the addressee of the shipment, courier A attempts delivery. If nobody is available for receiving the shipment at the indicated address, or if the address turns out to be incorrect, courier A registers a non-delivered exception. This can be achieved by scanning the label on the shipment for delivery, which is detected by mobile terminal 310, and then selecting a non-delivered exception option offered by mobile terminal 310 (e.g. instead of a delivered option that may be selected in case the delivery is successful). Mobile terminal 310 creates a not-home (NH) event for the shipment and transmits a message including an indication of the NH event as well as an identification of the shipment and an identification of courier A to server 330. (action 511) Upon receipt of the message, server 330 may update the status data for the shipment. In case a plurality of shipments could not be delivered at the same destination, optionally a single event and message could be created for all of these shipments. If the address is correct, courier A may leave a card at the mailbox to inform the addressee about the delivery attempt and, for example, an indication that the shipment may be collected at a particular service point 340.

If the indicated destination of the shipment is some service point, in contrast, there is no attempt to deliver the shipment to the customer directly.

Courier A now has to take care that the shipment reaches a service point 340 at which the addressee may collect the shipment or that it is returned to the sender, as the case may be. In any case, the shipment has to be handed over to some other party at a suitable point of time.

The presentation of the My Route list may generally be associated with a handover option. (action 512) Courier A may select a first approach or a second approach for handling a handover of shipments.

In a first approach, mobile terminal 310 detects a selection of a handover option by courier A and presents a handover overview. At this point of time, the overview is still empty. (action 513) Mobile terminal 310 now enables a scanning of shipments into the handover overview by scanning the labels of the concerned shipments. (action 514) Shipments may be scanned while they are being unloaded them from the van of courier A. The detected scanned data for each shipment is used as a basis for items that are added to the presented handover overview.

For a second approach, mobile terminal 310 enables and detects a selection of items in the My Route list. Shipments may be unloaded from the van of courier A in parallel with the selection, for example. In addition, mobile terminal 310 detects a subsequent selection of a handover option by courier A. (action 515) Mobile terminal 310 may now presents a handover overview including a list of the selected items only. (action 516) For the selection of items for handover, courier A may also select an entire group of items. However, for the handover overview, all groups of items that may previously have been manually grouped by courier A are preferably, though not necessarily, broken up and listed individually.

It is to be understood that with both approaches, the data that forms the basis for the handover overview may but does not have to be stored again. Instead, each item of the handover overview could be a link to data that is already stored for the associated shipment in memory 313. If the shipments are scanned into the handover overview, the shipment identifications in the scanned data could be used for finding previously stored data for a shipment in memory 313.

Courier A may be required by mobile terminal 310 to confirm that items for all shipments that are to be handed over are included in the handover overview. Mobile terminal 310 detects the confirmation. (action 517)

When the assembly of items for shipments that are to be handed over has been completed, a handover summary may be presented. The summary may include for example the total number of shipments, the total number of pieces belonging to the shipments and the total number of invoices that have be handed over along with the shipments. The handover summary may also include a drop down list for enabling courier A to select a handover type. Possible handover (HO) types may include "HO to service point", "HO to sweeper", "feeder HO" and "pickup HO". If the selected handover type is a handover to another courier, courier A may also be requested to enter the identification of courier B as well as the route identification of the route of courier B into the handover summary. Courier A could also be enabled to enter remarks into the handover summary. Mobile terminal 310 may also request a further confirmation from courier A to proceed to handover. The confirmation can be detected along with the selected handover type and of other information that may have been entered by courier A in the summary overview window. (action 518)

For the current examples, courier A may select either a "HO to service point" or a "HO to sweeper" as handover type.

Figure 6:
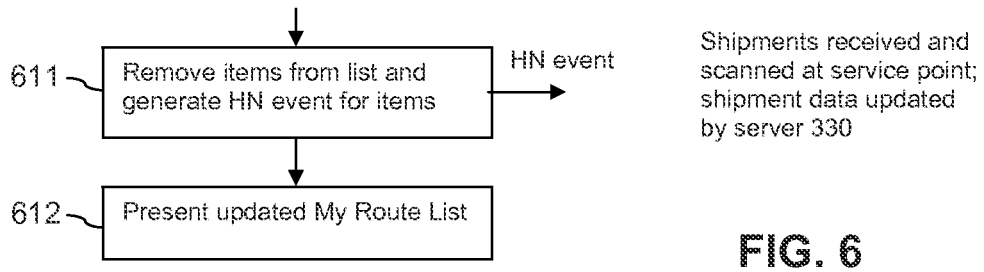
FIG. 6 is a flow chart illustrating third example operations in the system of FIG. 3.

FIG. 6 is a flow chart illustrating an example of further operations in case courier A selects the "HO to service point" as handover type. The presented operations are carried out by mobile terminal 310 when processor 311 runs program code for supporting the handling of information relating to shipments from memory 312.

The service point 340 can be for instance a manned service point of the logistics company or some other entity. Service point 340 can be a service point that has been selected in the first place as a destination of a shipment by the sender, or it can be a service point at which an addressee may collect the shipment in case an attempted delivery was not successful.

All data that is associated with the shipments that are to be handed over to service point 340 are removed memory 313, including the corresponding items for the My Route list and the Load list. In addition, mobile terminal 310 creates a handover (HN) event and transmits a message to server 330, which including an indication of the HN event, the identification of all selected shipments and information possibly input by courier A on the handover summary screen. (action 611)

The shipments that are handed over to service point 340 are scanned at service point 340. A corresponding event is created by service point 340 and transmitted in a message to server 330 along with identifications of the shipments and of service point 340.

Server 330 compares the content of the received messages and updates the data stored in memory 331. Customers accessing server 330 for information on a particular shipment may be informed based on the updated data that the shipment is available for collection at the particular service point.

The updated My Route list may now be presented again on touchscreen 316. (action 612)

Figure 7:
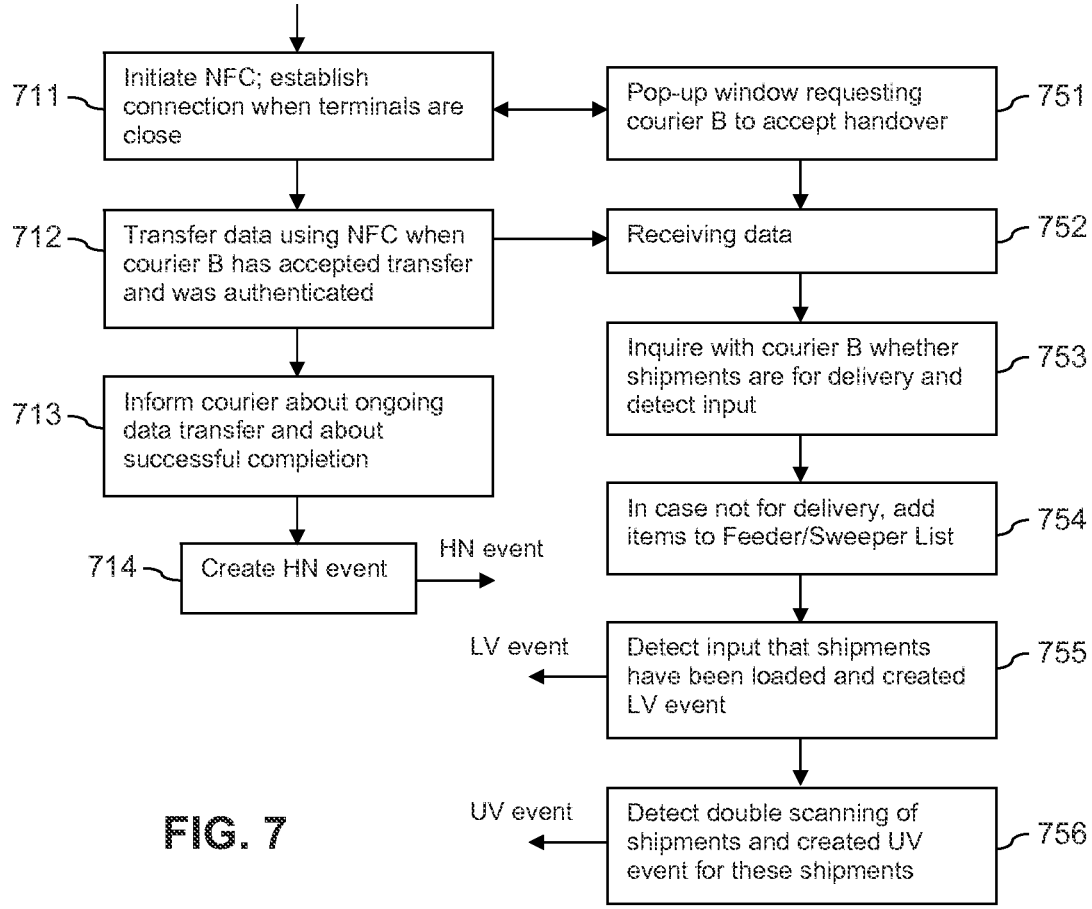
FIG. 7 is a flow chart illustrating fourth example operations in the system of FIG. 3.

FIG. 7 is a flow chart illustrating an example of further operations in case courier A selects the "HO to sweeper" as handover type. The operations presented on the left hand side are carried out by mobile terminal 310 of courier A when processor 311 runs program code for supporting the handling of information relating to shipments from memory 312. The operations presented on the right hand side are carried out by mobile terminal 350 of courier B. Mobile terminal 350 may comprise the same computer program or set of computer programs stored in a memory for execution by a processor as mobile terminal 310. When mobile terminal 310 and 350 are interacting, they may execute for example different code of the same program or different programs of the same set of programs.

The handover type "HO to sweeper" may be selected, if an attempt to deliver shipments to at least one addressee was not successful, and the shipments are not to be deposited at a service point for collection but to be returned to the sender. To this end, the shipments are handed over to a second courier B, who transports shipments, which may be received from different couriers, to a suitable facility.

Upon selection of the handover type "HO to sweeper", mobile terminals 310 initiates an NFC connection with mobile terminal 350 of courier B. Mobile terminal 310 requests courier A to ensure that mobile terminals 310 and 350 are held together to enable the establishment of an NFC connection. (action 711)

When the devices are held together, a popup is initiated at mobile terminal 350 from whatever screen courier B is currently viewing. Courier B is asked by mobile terminal 350 whether a handover is accepted. The popup window may also include an indication of the number of shipments and the number of associated invoices, in order to enable courier B to decide whether he has the capacity to handle the shipments after handover. Mobile terminal 350 detects a corresponding confirmation of courier B and provides authentication data for courier B to mobile terminal 310. (action 751)

Based on the received authentication data, mobile terminal 310 performs an authentication of Courier B. In case the authentication is positive, mobile terminal 310 transfers the shipment data for all shipments that have been selected for handover in actions 513-516 of FIG. 5 to mobile terminal 350 using the NFC connection. (action 712)

Mobile terminal 350 receives and stores the transferred data. (action 752)

While the transfer is ongoing, information on the progress may be presented to courier A by mobile terminal 310 and to courier B by mobile terminal 350, including a request to keep the terminals close to each other until the data transfer is complete. For example, proximity of less than 5 meters may be requested.

Mobile terminal 310 informs courier A once the data transfer has been completed successfully. (action 713) The transferred data may be cancelled from memory 313, including the corresponding items for the My Route list and the Load list. In addition, an updated My Route list may be presented to courier A.

Mobile terminal 310 moreover creates a HN event and transmits a message with an indication of this event, with an identification of courier A, with identifications of all shipments for which data has been transferred and with an identification of the route of courier B to server 330. (action 714)

Courier A also hands over the printout of the documents associated with the shipments to courier B.

In the meantime, mobile terminal 350 inquires with courier B whether the shipments are for delivery and detects a corresponding input. (action 753)

Courier B indicates in this example that the shipments are not for delivery and, as a result, mobile terminal 350 adds items based on the received data to its Feeder/Sweeper list. (action 754) The updated Feeder/Sweeper list is presented to courier B. The added items may optionally be highlighted, for example until courier B switches to another window.

Mobile terminal 350 creates am LV event for all shipments for which data has been received and creates a message including an indication of the LV event, an identification of the shipments and an identification of courier B. (action 755) The creation of the LV event may also require a preceding confirmation of courier B that the shipments have actually been loaded into the van of courier B. The message is transmitted to server 330.

When courier B arrives at a facility at which the shipments are to be unloaded, courier B unloads the van and creates an unload van (UV) event. The UV event can be created by selecting an unload option and by double scanning all shipments that are being unloaded. A message with an indication of an UV event and an identification of all double scanned shipments and an identification of courier B are transmitted to server 330.

Server 330 updates the data in memory 331 based on all received event messages.

Figure 8:
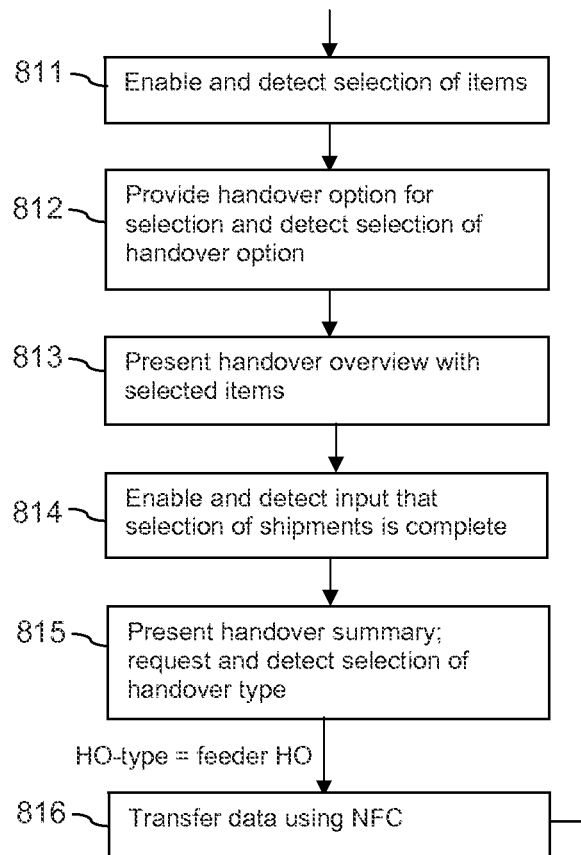
FIG. 8 is a flow chart illustrating fifth example operations in the system of FIG. 3.
Figure 8:
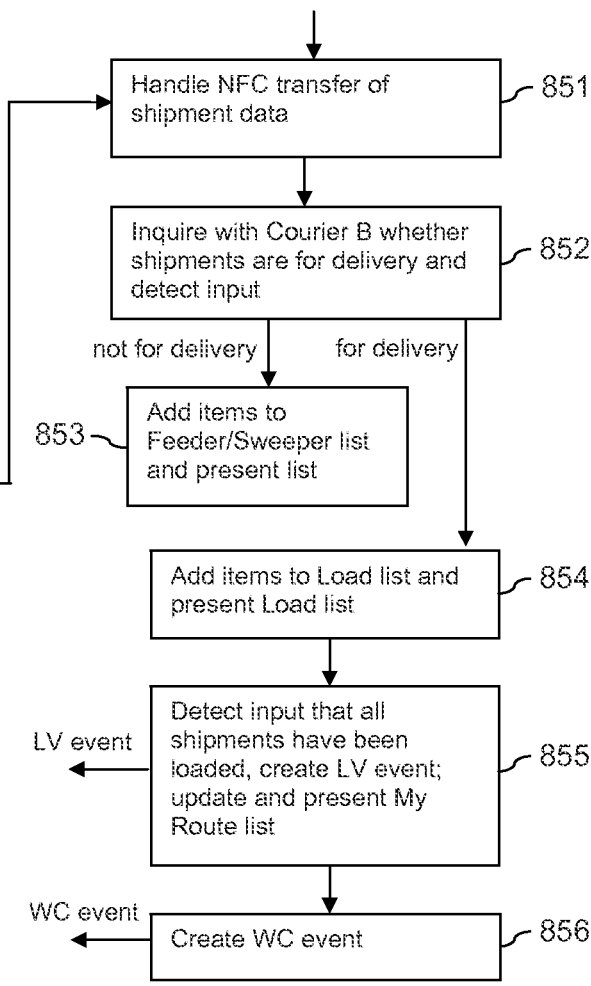

FIG. 8 is a flow chart illustrating another possible further handling of shipments following the operations of FIG. 4, once the van of courier A has been loaded at facility 320. The operations presented on the left hand side are carried out by mobile terminal 310 when processor 311 runs program code for supporting the handling of information relating to shipments from memory 312. The operations presented on the right hand side are carried out by mobile terminal 350 of a second courier B.

It is assumed that the shipments have been loaded for handover and scanned into the Feeder/Sweeper list, and that the Feeder/Sweeper list including corresponding items is now presented.

No WC event is created in this case.

Courier A knows that some of the shipments listed in the Feeder/Sweeper list should be handed over to courier B, because their destination is located in an area in which courier B delivers shipments or because courier B is known to be able to hand over the shipments to a further courier who serves an area including the destination location. Courier A furthermore knows that he can expect to meet courier B—and possibly some other couriers to whom shipments are to be handed over—at a certain place at a certain time.

Mobile terminal 310 enables a selection of items in the Feeder/Sweeper list and offers a handover option when the Feeder/Sweeper list is presented. When courier A meets courier B, courier A may select those items in the list that are associated with the shipments that are to be handed over to courier B. Shipments may be unloaded from the van of courier A in parallel with the selection, for example. Mobile terminal 310 detects a selection of items in the Feeder/Sweeper list. (action 811)

In addition, mobile terminal 310 detects a subsequent selection of a handover option by courier A. (action 812) Mobile terminal 310 may now presents a handover overview including a list of the selected items only. (action 813)

Courier A may be required by mobile terminal 310 to confirm that items for all shipments that are to be handed over are included in the handover overview. Mobile terminal 310 detects the confirmation. (action 814)

When the assembly of items for shipments that are to be handed over has been completed, a handover summary may be presented. (action 815) The summary may include the total number of shipments, the total number of pieces belonging to the shipments and the total number of invoices that have be handed over along with the shipments. The handover summary may include a drop down list for enabling courier A to select a handover type. As before, possible handover types may include "HO to service point", "HO to sweeper", "feeder HO" and "pickup HO". If the selected handover type is a handover to another courier, courier A may also be requested to enter the identification of courier B as well as the route identification of the route of courier B in the handover summary. Courier A could also be enabled to enter remarks in the handover summary. Mobile terminal 310 may also request a further confirmation from courier A to proceed to handover. The confirmation can be detected along with the selected handover type and of other information that may have been entered by courier A in the summary overview window.

In the current example, courier A may select a "feeder HO" as handover type.

Mobile terminal 310 establishes an NFC connection, transfers the selected data via the connection to mobile terminal 350 used by courier B and creates an HN event, as described with reference to actions 711 to 714 of FIG. 7. (action 816) Mobile terminal 350 handles the NFC transfer of shipment data as described with reference to actions 751 and 752 of FIG. 7. (action 851)

Mobile terminal 350 inquires with courier B whether the shipments are for delivery and detects a corresponding input of courier B. (action 852)

If the input of courier B indicates that the shipments are not for delivery, mobile terminal 350 adds items based on the received data to its Feeder/Sweeper list and proceeds as described with reference to actions 755 and 756 of FIG. 7. (action 853)

If the input of courier B indicates that the shipments are for delivery, mobile terminal 350 adds items based on the received data to its Load list and presents the Load list. The added items may optionally be highlighted, for example until courier B switches to another window. (action 854) Some or all of the items may have been handed over in a group. When courier B indicates that the shipments are for delivery, the group is ungrouped before being added separately to the Load list.

Mobile terminal 350 detects an input of courier B confirming that all shipments have been loaded. Mobile terminal 350 creates a LV event for all shipments for which data has been received and creates a message including an indication of the LV event, an identification of the shipments and an identification of courier B. In addition, the My Route list of mobile terminal 350 is updated and presented to courier B. (action 855)

In addition, mobile terminal 350 creates a WC event for all shipments that have been newly added to the Load list. (action 856) A message indicating this event, the associated shipment identifications and an identification of courier B is transmitted to server 330.

Server 330 updates the data in memory 331 based on all received event messages.

Figure 9:
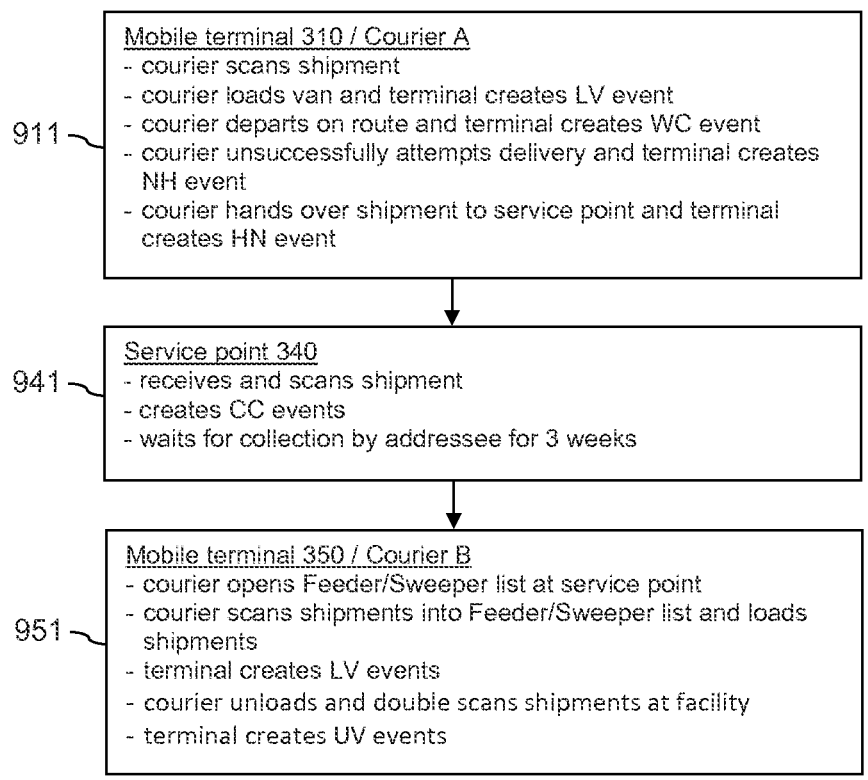
FIG. 9 is a flow chart illustrating sixth example operations in the system of FIG. 3.

FIG. 9 is a flow chart illustrating an overview over operations that may be performed, when a shipment could not be delivered and is not collected within a predetermined time by the addressee at a service point either. The same operations could be performed when the service point was the original destination of the shipment and is not collected within a predetermined time by the addressee.

The operation summarized as actions 911 are carried out by courier A and by mobile terminal 310 when processor 311 runs program code for supporting the handling of information relating to shipments from memory 312.

Courier A scans shipments at facility 320 into a My Route list, loads the shipments into a van, and mobile terminal 310 creates an LV event and an WC event. Courier A departs on route. Courier A attempts unsuccessfully to deliver certain shipments and creates NH events for each of these shipments. Courier A hands over these shipments to a manned service point 340 and mobile terminal 310 creates an HN event. All events are transmitted in a respective message to server 330. Action 911 may basically correspond to the operation described with reference to FIGS. 4, 5 and 6.

The operations summarized as actions 941 are carried out at service point 340.

An employee of service point 340 scans the received shipments using a scanner of service point 340, and a connected device creates a consignee collect (CC) event for the event and transmits a message indicating the CC event, an identification of the shipments and an identification of the service point 340 to server 330. Server 330 updates the status information for the shipments based on the received message. "Consignee collect" means that the customer has agreed to collect the shipment personally from the service point. Such an agreement may also be assumed to be given, if the addressee of a shipment is not available when a delivery is attempted and a note is left about the possibility to collect the shipment at a particular service point. When a shipment has remained with the shop 340 for three weeks, for instance, this is noted by server 330.

The operations summarized as actions 951 are carried out by courier B and mobile terminal 350.

Mobile terminal 350 is informed by server 330 about shipments that have not been collected from a particular service point 340 within a predetermined time. The message requests courier B to collect the shipment(s) for return to the sender. Courier B may accept the request. In this case, mobile terminal 350 transmits a corresponding confirmation to server 330.

When arriving at service point 340, courier B opens the Feeder/Sweeper list on a touchscreen of mobile terminal 350. Courier B scans the concerned shipment(s) into the Feeder/Sweeper list and loads the shipment(s) into the van of courier B. The shipment(s) may be scanned into a special group for non-delivery items. Such a group may be predefined, or it may be created by courier B in the Feeder/Sweeper list. Mobile terminal 350 creates an LV event, once courier B confirms that the loading has been completed.

Mobile terminal 350 transmits a message including the event to server 330. No WC events are created for items on the Feeder/Sweeper list.

Courier B continues his route. When arriving at a facility at which the shipments collected at service point 340 and possibly at other service points are to be unloaded, courier B selects an unload option offered by mobile terminal 350 and double scans the shipments that are being unloaded. When courier B confirms that the unloading has been completed, mobile terminal 350 creates an UV event and transmits a message including an indication of the UV event, an identification of the unloaded shipments and an identification of courier B to server 330. The corresponding items are deleted from the Feeder/Sweeper list of mobile terminal 350 along with any associated data that is stored in a memory of mobile terminal 350, and the updated Feeder/Sweeper list is presented to courier B.

Figure 10:
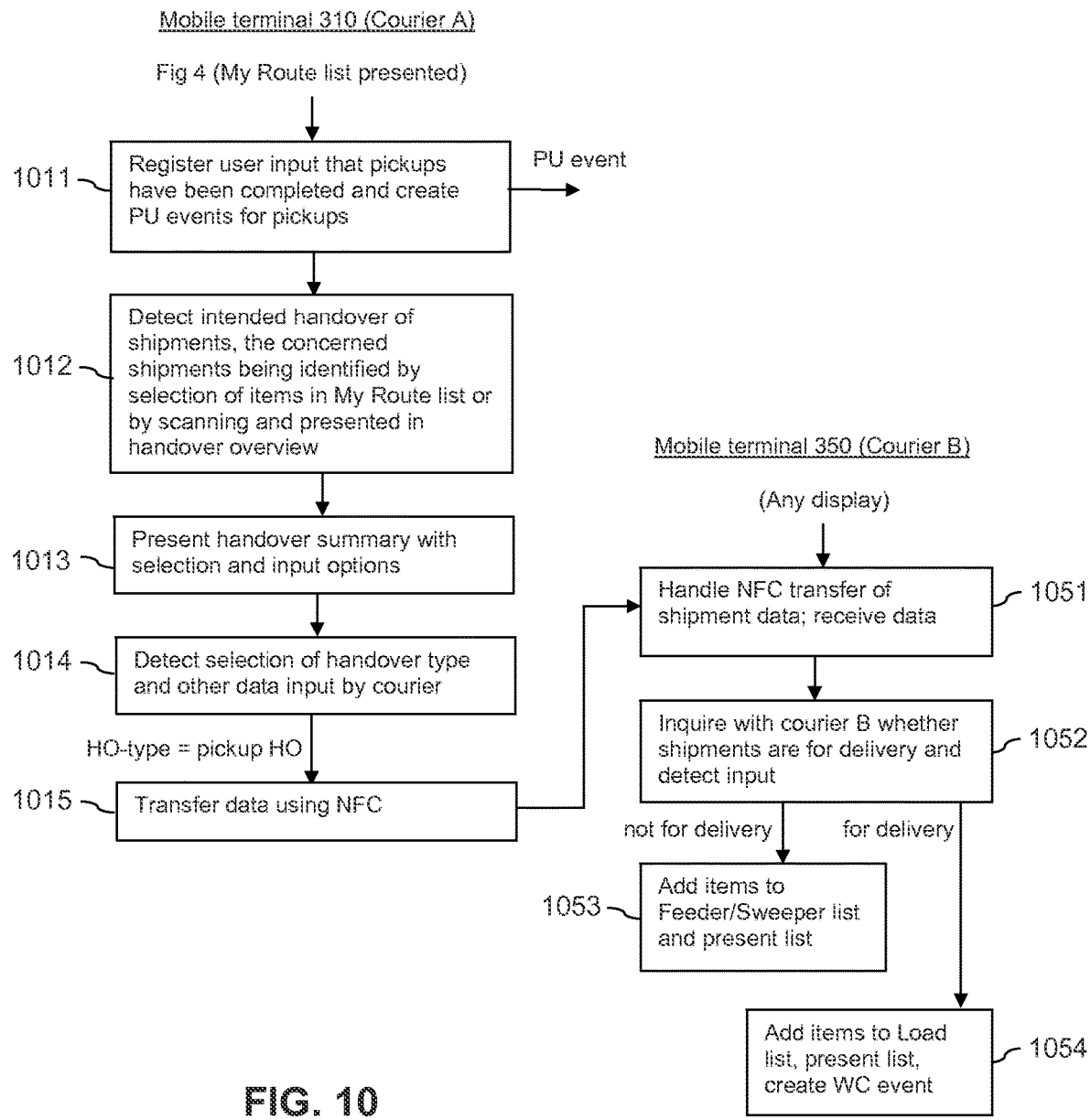
FIG. 10 is a flow chart illustrating seventh example operations in the system of FIG. 3.

FIG. 10, finally, is a flow chart illustrating a possible further handling of pickups following the operations of FIG. 4, once the van of courier A has been loaded at facility 320. The operations presented on the left hand side are carried out by mobile terminal 310 when processor 311 runs program code for supporting the handling of information relating to shipments from memory 312. The operations presented on the right hand side are carried out by mobile terminal 350 of a second courier B.

It is assumed that the shipments have been loaded for delivery and scanned into the Load list, and that corresponding items are now being presented by mobile terminal 310 in the My Route list.

Courier A departs on route, tries to deliver shipments and picks up shipments from customers, as required by the My Route list. Labels on the picked up shipments may be scanned, the decoded data may be compared with the data of the pickup items in the list, and a respective matching item can be marked to show that the shipment has been picked up.

Once a pickup has been completed, a pickup (PU) event is created by mobile terminal 310. Mobile terminal 310 creates a message including an indication of the PU event, an identification of the picked up shipment and an identification of courier A, and transmits the message to server 330. (action 1011)

When courier A meets courier B at a predetermined meeting point, courier A may decide to handover some or all of the pickups to courier B. If courier B is primarily a delivering courier working with a My Route list, courier A may select all pickups that have a destination in the area served by courier B for handover. If courier B is primarily a sweeper courier working with a Feeder/Sweeper list, courier A may select all pickups that should be sorted at a facility for outbound shipments for handover to courier B. The facility could also be facility 320, to which courier A may return at the end of the working day but courier B might reach the facility earlier.

Mobile terminal 310 may detect an intended handover of shipments, when courier A selects a handover option. The concerned shipments may be identified by selection of associated items in the My Route list or by scanning, and the relevant items may be presented in a handover overview. The selection may correspond to one of the approaches described with reference to actions 513 to 517 of FIG. 5. (action 1012)

When the assembly of items for shipments that are to be handed over has been completed, a handover summary may be presented. The handover summary may include a drop down list for enabling courier A to select a handover type. The selectable handover types may be the same as in the previous examples. If the selected handover type is a handover to another courier, courier A may also be requested to enter the identification of courier B as well as the route identification of the route of courier B in the handover summary. Courier A could also be enabled to enter remarks. Courier A may be requested to confirm to proceed to handover. (action 1013)

Upon confirmation of courier A to proceed with the handover, mobile terminal 310 detects the user selection of the handover type and any further data input by courier in the handover summary screen. (action 1014)

In the current example, courier A may select a "pickup HO" as handover type.

Mobile terminal 310 establishes thereupon an NFC connection, transfers the selected data and creates an HN event, as described with reference to actions 711 to 714 of FIG. 7. (action 1015) Mobile terminal 350 handles the NFC transfer of shipment data as described with reference to actions 751 and 752 of FIG. 7. (action 1051)

Mobile terminal 350 inquires with courier B whether the shipments are for delivery and detects a corresponding input. (action 1052)

If the input of courier B indicates to mobile terminal 350 that the shipments are not for delivery, mobile terminal 350 adds items based on the received data to its Feeder/Sweeper list and proceeds as described with reference to actions 754 to 756 of FIG. 7. (action 1053) If a group of items had been selected for handover at mobile terminal 310, a corresponding group item may be added to the Feeder/Sweeper list by mobile terminal 350.

If the input of courier B indicates to mobile terminal 350 that the shipments are for delivery, mobile terminal 350 adds items based on the received data to its Load list, updates a My Route list and creates WC events, as described with reference to actions 854 to 856 of FIG. 8. (action 1054) If a group of items had been selected for handover at mobile terminal 310, the items are ungrouped before they are added to the Load list.

When courier A arrives at facility 320 again at the end of the working day, mobile terminal 310 may create an arrival event. Courier may then sign off and mobile terminal 310 may create a sign off event. Mobile terminal 310 may then assemble a message including an indication of the arrival event and of the sign off event and transmit the message to server 330 before mobile terminal 310 is switched off It is to be understood that events do not have to be indicated in a message as soon as they are created. Events could also be indicated collectively in a message that is transmitted for example every 15 minutes as long as at least one event has been created after transmission of the last message.

It is to be understood that a mobile terminal 310 may allow adding items for some shipments to the Load list and adding items for other shipments to the Feeder/Sweeper list. That is, a particular courier could operate at the same time as delivering courier and/or as feeder and/or as sweeper.

It is to be understood that actions described for mobile terminal 310 could also be performed by mobile terminal 350 and that the actions described for mobile terminal 350 could also be performed by mobile terminal 310 when processor 311 executes corresponding program code from memory 312. This may have the advantage that a single, comprehensive computer program or computer program structure may be used for all tasks handled by the couriers so that a uniform user interface can be provided. This simplifies the implementation of the mobile terminals and makes it easier for couriers to switch between roles.

It is to be understood that the presented operations may be modified in many ways. For instance, actions may be added or omitted, or the order of actions may be changed. The operations as such may also be modified in many ways.

Depicted or described connections between components are generally to be understood to be functional connections. They can be implemented as direct links or as indirect links via several other components. The order of presented actions is not mandatory; alternative orders are possible. Actions can be implemented in different ways. They could be implemented in software using program instructions; or they could be implemented in hardware; or they could be implemented making use of a combination of hardware and software.

It is to be understood that the described embodiments are examples only, which may be modified and/or supplemented in many ways within the scope of the claims. In particular, any feature described for a particular embodiment can be used by itself or in combination with other features in any other embodiment. Each feature that has been described for an embodiment of a particular category can also be used in an equivalent manner in an embodiment of any other category.

What is claimed is:

1. A method comprising, performed by a device:
   enabling a courier to select one of two lists managed by the device, a first list being provided for shipments that are to be delivered to a respective destination of the shipments by the courier and a second list being provided for shipments that are not to be delivered to a respective destination of the shipments by the courier, and detecting a selection of one of the two lists;
   scanning with a scanning component of the device at least one label associated with a shipment or with a group of shipments when loading the shipment or the group of shipments in a vehicle;
   receiving data that results from a scanning of at least one label that is associated with a shipment or with a group of shipments when loading the shipment or the group of shipments in a vehicle;
   adding at least one item to the selected list, each of the at least one item associated with a shipment or with a group of shipments, based on the received data;
   detecting a selection of a handover option, while a list is presented on a display, wherein the list is one of the first list, the second list and a third list, wherein the third list includes items of the first list, items associated with shipments that are to be picked up by the courier at customer sites, and items associated with shipments that have been picked up by the courier at customer sites;
   receiving data, based on the selection of the handover option, of at least one label that is associated with a shipment or a group of shipments and that is scanned by the scanning component of the device for handover;
   presenting a handover overview with a list of items, each item of the list of items being associated with a shipment or with a group of shipments for which a label has been scanned for handover;
   transferring data to a second device using a wireless connection, wherein the transferred data comprises at least one item of the list of items; and
   removing, the at least one item from the list upon the transfer of data.

2. The method according to claim 1, wherein a message assembled by the device and caused to be transmitted to a server includes at least one of the following:

an indication of a load-vehicle event that is created upon confirmation by the courier that a loading of shipments to a vehicle has been completed;

an indication of a depart event that is created upon input by the courier indicating that the courier leaves a predetermined area;

an indication of a depart event that is created automatically when the device or a vehicle used by the courier leaves a predetermined area;

an indication of a not-home event that is created upon an indication input by the courier that a shipment could not be delivered at an indicated destination;

an indication of a handover event that is created when a handover of shipments to a third party has been confirmed by the courier;

an indication of a handover event that is created when selection of a particular handover type by the courier is detected;

an indication of a handover event that is created when data on shipments that are to be handed over to another courier has been transferred to a device of the other courier;

an indication of an unload event that is created when detecting a double scan of a label associated with a shipment or a group of shipments while an item associated with the shipment or the group of shipments has been added to the first list or the second list;

an indication of an arrival event that is created upon input by the courier indicating arrival at a predetermined area;

an indication of an arrival event that is created automatically when the device or a vehicle used by the courier enters a predetermined area; and/or information on a mileage of a vehicle input by courier.

3. The method according to claim 1, further comprising triggering, by the device, a print out of documents relating to a shipment for each of the shipments for which an item has been added to one of the first list and the second list.

4. The method according to claim 1, wherein the third list is created by the device.

5. The method according to claim 1, wherein the detecting the selection of the handover option further includes a selection of a type of handover.

6. The method according to claim 1, wherein the device is a first device, and wherein the second device performs the steps of:
receiving the transferred data from the first device, wherein the wireless connection is performed using near field communication;
detecting an input, by the second device, of adding at least one item to a first list managed by the second device, each of the at least one item associated with a shipment or with a group of shipments, based on the received transferred data wherein the first list managed by the second device is for each of the at least one items that are to be delivered to a respective destination of the shipments; and
detecting an input, by the second device, of adding at least one item to a second list managed by the second device, each of the at least one item associated with a shipment or with a group of shipments, based on the received transferred data wherein the second list managed by the second device is for each of the at least one items that are not to be delivered.

7. An apparatus comprising at least one processor and at least one memory storing a computer program, the at least one memory and the computer program configured to cause the apparatus to perform the following when the computer program is executed by the at least one processor:
enable a courier to select one of two lists managed by a device, a first list being provided for shipments that are to be delivered to a respective destination of the shipments by the courier and a second list being provided for shipments that are not to be delivered to a respective destination of the shipments by the courier, and detect a selection of one of the two lists;
scan with a scanning component of the device at least one label associated with a shipment or with a group of shipments when loading the shipment or the group of shipments in a vehicle;
receive data that results from a scanning of at least one label that is associated with a shipment or with a group of shipments when loading the shipment or group of shipments in a vehicle;
add at least one item to the selected list, each of the at least one item associated with a shipment or with a group of shipments, based on the received data;
detect a selection of a handover option, while a list is presented on a display, wherein the list is one of the first list, the second list and a third list, wherein the third list includes items of the first list, items associated with shipments that are to be picked up by the courier at customer site, and items associated with shipments that have been picked up by the courier at customer sites;
receive data, based on the selection of the handover option, of at least one label that is associated with a shipment or a group of shipments and that is scanned by the scanning component of the device for handover;
present a handover overview with a list of items, each item of the list of items being associated with a shipment or with a group of shipments for which a label has been scanned for handover;
transfer data to a second device using a wireless connection, wherein the transferred data comprises at least one item of the list of items; and
remove the at least one item from the list of items upon the transfer of data.

8. The apparatus according to claim 7, the computer program further configured to, when the computer program is executed by the at least one processor, cause the apparatus to include a message, to be transmitted to a server and assembled by the apparatus, wherein the message is at least one of the following:
an indication of a load-vehicle event that is created upon confirmation by the courier that a loading of shipments to a vehicle has been completed;
an indication of a depart event that is created upon input by the courier indicating that the courier leaves a predetermined area;
an indication of a depart event that is created automatically when the device or a vehicle used by the courier leaves a predetermined area;
an indication of a not-home event that is created upon an indication input by the courier that a shipment could not be delivered at an indicated destination;
an indication of a handover event that is created when a handover of shipments to a third party has been confirmed by the courier;
an indication of a handover event that is created when selection of a particular handover type by the courier is detected;

an indication of a handover event that is created when data on shipments that are to be handed over to another courier has been transferred to a device of the other courier;

an indication of an unload event that is created when detecting a double scan of a label associated with a shipment or a group of shipments while an item associated with the shipment or the group of shipments has been added to the first list or the second list;

an indication of an arrival event that is created upon input by the courier indicating arrival at a predetermined area;

an indication of an arrival event that is created automatically when the device or a vehicle used by the courier enters a predetermined area; and/or information on a mileage of a vehicle input by courier.

9. The apparatus according to claim 7, wherein the computer program is further configured to, when the computer program is executed by the at least one processor, cause the apparatus to trigger a print out of documents relating to a shipment for each of the shipments for which an item has been added to one of the first list and the second list.

10. The apparatus according to claim 7, the computer program further configured to, when the computer program is executed by the at least one processor, cause the apparatus to create the third list.

11. The apparatus according to claim 7, wherein the detecting the selection of the handover option causes the computer program to, when the computer program is executed by the at least one processor, cause the apparatus to:

detect, by the device, a selection of a type of handover.

12. A non-transitory computer readable medium storing a computer program, the computer program configured to, when executed by at least one processor, cause a device to perform the following enable a courier to select one of two lists managed by the device, a first list being provided for shipments that are to be delivered to a respective destination of the shipments by the courier and a second list being provided for shipments that are not to be delivered to a respective destination of the shipments by the courier, and detect a selection of one of the two lists;

scan with a scanning component of the device at least one label associated with a shipment or with a group of shipments when loading the shipment or the group of shipments in a vehicle;

receive data that results from a scanning of at least one label that is associated with a shipment or with a group of shipments when loading the shipment or the group of shipments in a vehicle;

add at least one item to the selected list, each of the at least one item associated with a shipment or with a group of shipments, based on the received data;

detect a selection of a handover option, while a list is presented on a display, wherein the list is one of the first list, the second list and a third list, wherein the third list includes items of the first list, items associated with shipments that are to be picked up by the courier at customer sites, and items associated with shipments that have been picked up by the courier at customer sites;

receive data, based on the selection of the handover options, of at least one label that is associated with a shipment or a group of shipments and that is scanned by the scanning component of the device for handover;

present a handover overview with a list of items, each item of the list of items being associated with a shipment or with a group of shipments for which a label has been scanned for handover;

transfer data to a second device using a wireless connection, wherein the transferred data comprises at least one item of the list of items; and remove the at least one item from the list of items upon the transfer of data.

* * * * *

UNITED STATES PATENT AND TRADEMARK OFFICE
CERTIFICATE OF CORRECTION

PATENT NO. : 10,558,940 B2
APPLICATION NO. : 14/926627
DATED : February 11, 2020
INVENTOR(S) : Hari Bhaskaran et al.

Page 1 of 1

It is certified that error appears in the above-identified patent and that said Letters Patent is hereby corrected as shown below:

In the Claims

Claim 6, Line 2, "is a first device, and wherein the second device performs the", should read --is a first device, wherein the wireless connection is performed and wherein the second device performs the--;

Claim 6, Line 11, "transferred data wherein the first list managed by the", should read --transferred data, wherein the first list managed by the--;

Claim 6, Line 19, "transferred data wherein the second list managed by the", should read --transferred data, wherein the second list managed by the--.

Signed and Sealed this
Thirty-first Day of March, 2020

Andrei Iancu
*Director of the United States Patent and Trademark Office*